June 10, 1924.
L. BEHR
1,497,164
CONTROL METHOD AND APPARATUS
Filed Dec. 18, 1920   3 Sheets-Sheet 3
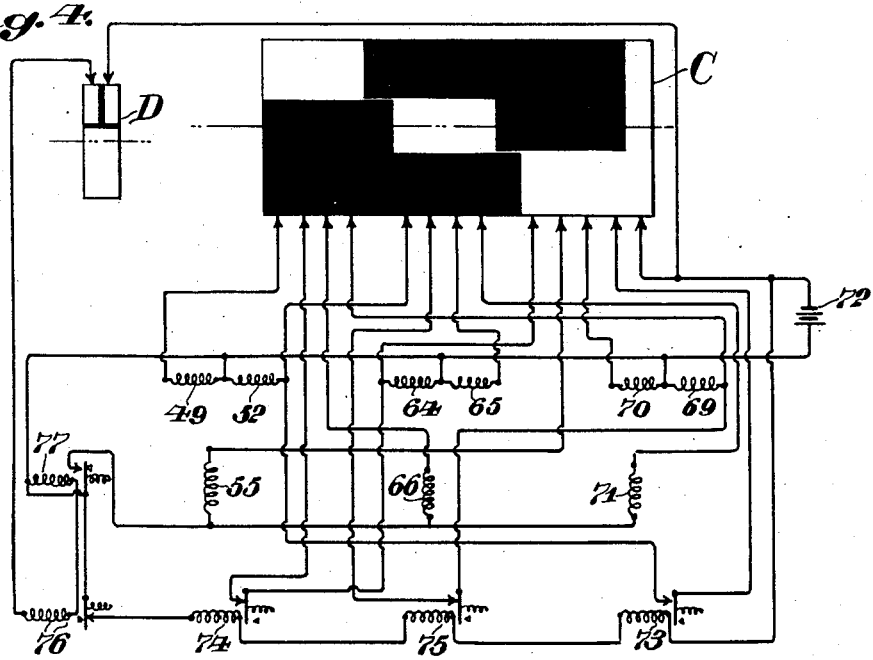
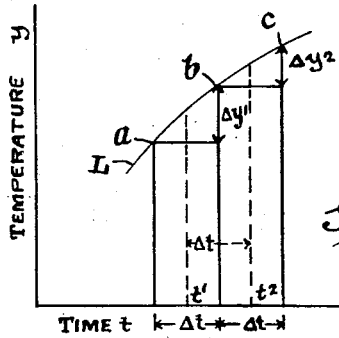
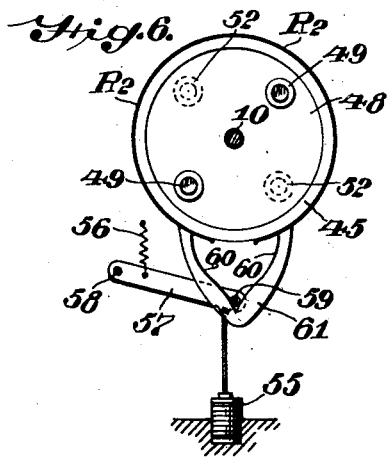
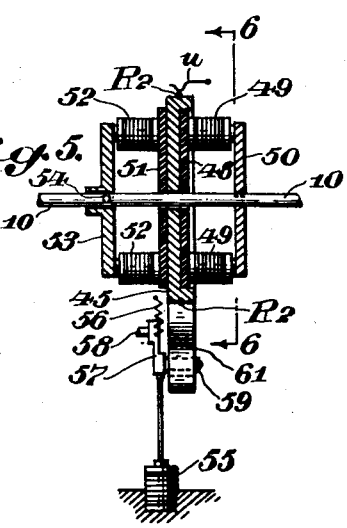
INVENTOR.
Leo Behr
BY Cornelius D. Ehret
his ATTORNEY.

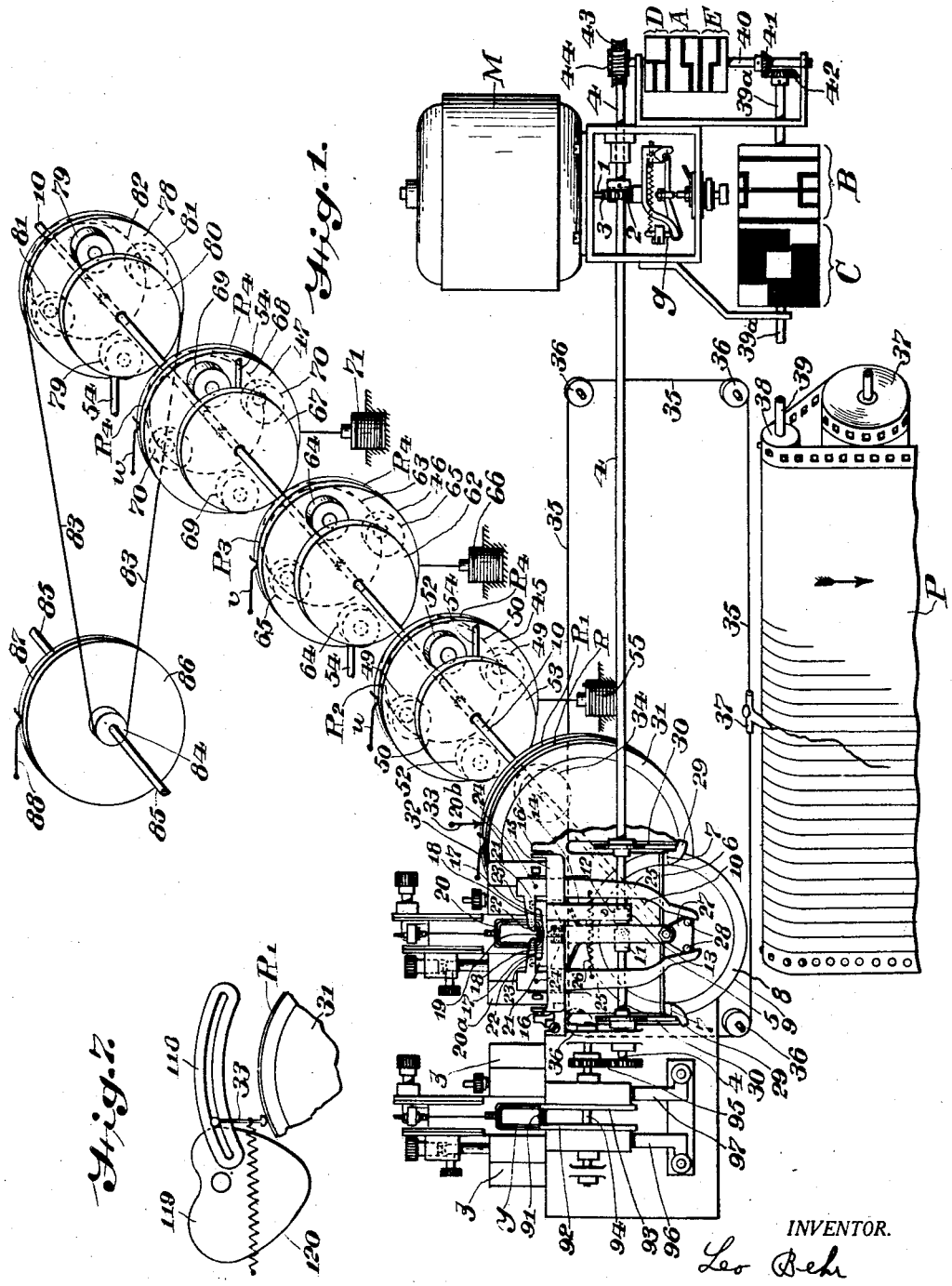

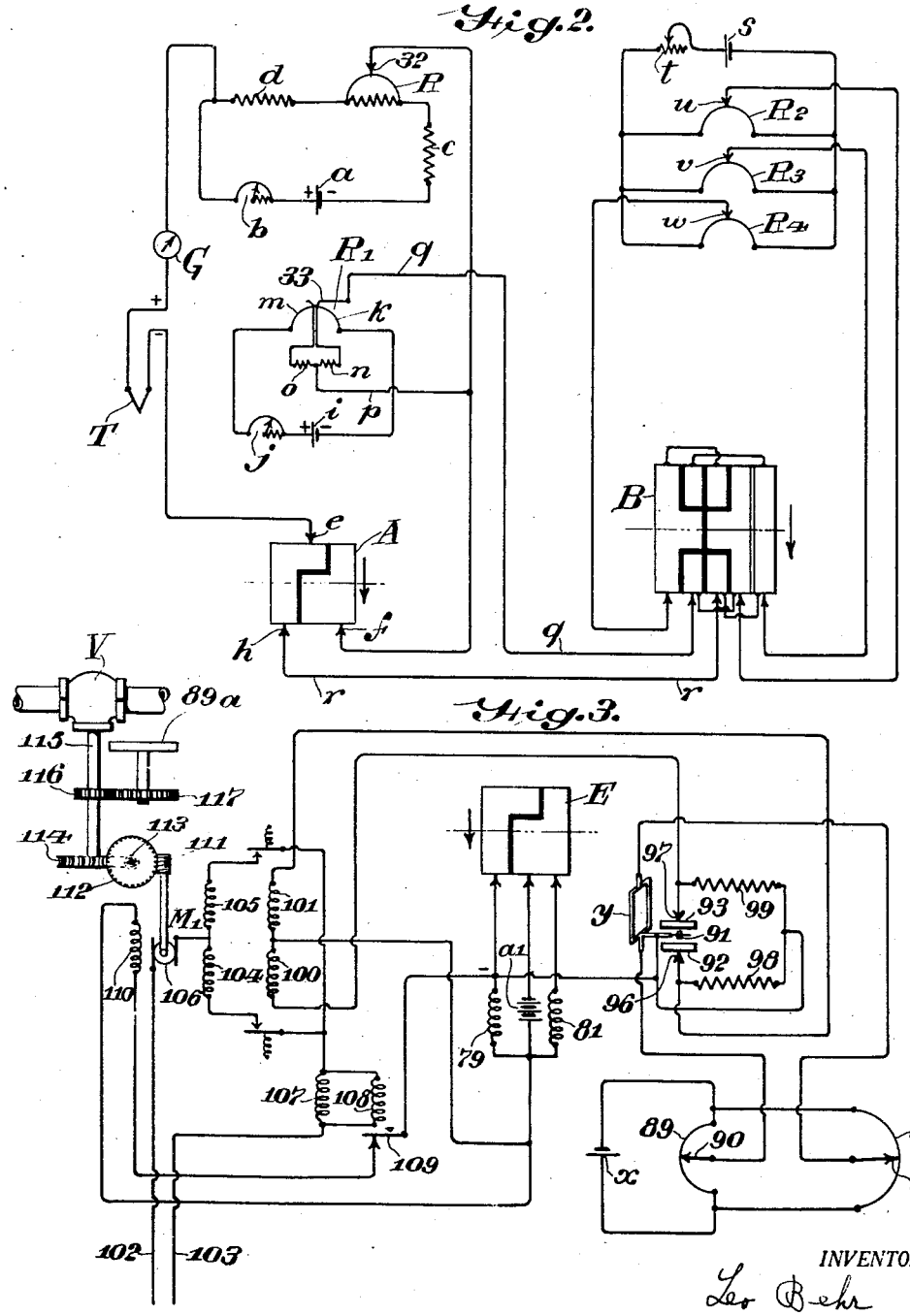

Patented June 10, 1924.

1,497,164

UNITED STATES PATENT OFFICE.

LEO BEHR, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

CONTROL METHOD AND APPARATUS.

Application filed December 18, 1920. Serial No. 431,570.

*To all whom it may concern:*

Be it known that I, LEO BEHR, a citizen of the United States, residing in the city and county of Philadelphia, State of Pennsylvania, have invented new and useful Improvements in Control Methods and Apparatus, of which the following is a specification.

My invention relates to a method of and apparatus for maintaining a predetermined magnitude of a condition, as electrical, thermal, chemical, or physical, or varying the magnitude of such condition in accordance with a predetermined program, by effecting in response to variations from said predetermined magnitude or program application of an agent, as current, heat, reagent, etc., suitable to change the magnitude of the condition involved.

My invention resides in a method and apparatus of the character referred to of which it is characteristic that as the magnitude of the condition is changed or changing with time, an electric circuit controlling application of the agent and responsive to changes in the magnitude of the condition is subjected to a control electro-motive-force whose magnitude is dependent upon the departure of the magnitude of the condition from predetermined magnitude and is so applied as to control the application or rate of application of the agent.

My invention resides further in a method and apparatus of the character referred to wherein the application or rate of application of the agent is effected in accordance with or in response to the second derivative of the magnitude of the condition with respect to time, that is, in accordance with or in response to the rate of change of the rate of change of the magnitude of the condition.

My invention resides in further features of method and apparatus herein described and claimed.

For an understanding of my method and for an illustration of some of the various forms my apparatus may take, reference is to be had to the accompanying drawings, in which:

Fig. 1 is a view of my apparatus partially in elevation and partially in perspective.

Fig. 2 is a diagrammatic view of a circuit for controlling a galvanometer in accordance with change in rate of change of temperature.

Fig. 3 is a diagrammatic view of a circuit arrangement utilizable for effecting control of a valve or the like in response to movements of the controlled movable structure of control apparatus, such as indicated in Fig. 1, or equivalent.

Fig. 4 is a diagrammatic view of a circuit arrangement utilizable for controlling clutch and control magnets of the apparatus indicated in Fig. 1.

Fig. 5 is a cross sectional view, partly in elevation, of clutch and resetting structure.

Fig. 6 is a sectional view, part in elevation, taken on the line 6—6 of Fig. 5.

Fig. 7 is an elevational view of structure utilizable for effecting program control.

Fig. 8 is an explanatory curve.

In the illustrated example of my apparatus parts thereof and their mode of operation are similar to those disclosed in prior Letters Patent of the United States to Leeds No. 1,125,699, my invention comprehending, but not being limited to their employment.

Referring to Fig. 1, M is a source of power, as a continuously rotating electric motor, whose speed is rendered practically constant or uniform by any suitable governing means, as the centrifugal governor $g$ driven by the motor shaft 1 and controlling contacts in the motor control circuit. Upon the shaft 1 is a worm 2 meshing with the worm 3 secured upon the shaft 4.

Pivoted near its upper end is a lever 5 upon which is horizontally pivoted the arm 6 on each end of which is a shoe 7 of cork or other suitable material biased by lever 5 toward and frictionally engaging the rim 8 of the clutch disk or wheel 9 secured upon the shaft 10. Secured upon the continuously rotating shaft 4 is a cam 11 which periodically moves the member 5 outwardly from the disk 9, thereby lifting the shoes 7 free from the rim 8 of disk 9, the shoes 7 returning into engagement with the rim 8 after predetermined rotation of the cam 11. Upon the shaft 4 is secured a second cam 12 which, after the cam 11 has lifted shoes 7 from rim 8, actuates the lower end of the arm 14 secured at its upper end to the member 15 pivoted at 16. Upon the member 15 is secured the members 17 whose upper edges 18 are inclined and increase in height from the center toward each side. Disposed immediately above the edge 18 is the needle or pointer 19 of any suitable deflecting measuring or indicating instrument responsive to changes in the condition whose magnitude is to be controlled. In the example illustrated, 19 is the needle or pointer of a galvanometer, hereinafter referred to, of which 20 is the movable coil or element which swings or deflects the needle or pointer 19 to the right or left. In the example illustrated, the galvanometer coil 20 is disposed in the magnetic field between the poles 20a and 20b of a permanent magnet. At opposite ends of the member 17 are the abutments 21 limiting the deflection of the needle 19. Directly above the needle 19 and below which it normally freely swings are the edges 22 of members 23, 23 pivoted at 24, 24 and extending toward each other, leaving a gap between their inner ends of sufficient width to allow the free entry of the needle 19 when in balanced, zero or mid position, the needle 19 normally swinging freely between the edges 18 and 22. The members 23 have the downwardly extending arms 25, 25 drawn toward each other by the spring 26. Attached to the lower end of the arm or lever 5 is the triangular plate 27 carrying the pins 28, 28 co-operating with the lower ends of the members 25, 25. At opposite ends of the arm 6 are the ears or lugs 29, 29 adapted to be engaged by the cams 30, 30 similar in shape and similarly positioned and secured upon the shaft 4.

The shaft 10 is rotated in the one direction or the other in accordance with direction of deflection of the galvanometer pointer 19; and the extent of rotation of the shaft 10 in either direction is dependent upon the extent of deflection of the pointer 19. If the galvanometer needle deflects toward the right, for example, it is clamped, due to the periodic vertical movement of the member 15 by the cam 12, between the inclined edge 18 and the lower edge 22 of the right hand member 23, causing the arm 25 to be tilted in a clockwise direction about its pivot 24, thereby pushing on the right hand pin 28 on plate 7, and so tilting the movable or driving clutch member or arm 6 in a clockwise direction, while cam 11 is holding shoes 7, 7 from the rim 8 of the clutch wheel or disk 9, the angular movement of the member 6 being dependent upon the degree of deflection of needle 19. The shoes 7 again engage the disk 8 upon release of the arm 5 by the cam 11, and the left hand cam 30 engages the left hand lug 29 on the arm 6, rotating the arm 6 in counter-clockwise direction and thereby rotating the disk 9 and the attached shaft 10 in counter-clockwise direction through an equal angle. Such rotation of the shaft causes rotation of the attached resistance disks tending to restore the galvanometer circuit to balanced condition and to decrease the deflection of the needle 19, which eventually, due to successive operations, will come to zero or mid position when the galvanometer circuit is balanced or when no current flows through the galvanometer.

Secured upon the driven shaft 10 is a disk or wheel 31 of insulating material carrying upon its periphery the resistance conductors R and R1 upon which bear, respectively, the brushes 32 and 33.

Secured upon the shaft 10 is the grooved pulley or wheel 34 around which is wrapped the cord 35 passing over the idlers 36 and attached to the pen or marker 37 moved by the cord 35 transversely of the recorder paper or sheet P stored in the roll 37 and unwound therefrom by the roller 38 driven by shaft 39 driven at suitable uniform speed. The shaft 39a is driven by shaft 40 through intermediate gears 41 and 42, the shaft 40 being driven by the worm wheel 43 in turn driven by the worm 44 secured upon the shaft 4.

Reference will now be had to Fig. 2 for a description of a mode of control of the apparatus of Fig. 1 thus far described in response to variations in temperature, as for example, variations in temperature of a furnace which it is desired shall be maintained at a predetermined temperature or whose temperature shall be varied in accordance with a definite program. While my description will be that of temperature only, it will be understood that my invention is equally applicable, particularly in its broader aspects, to response to and control of any other condition, as pressure, or any electrical condition, as voltage, current, resistivity, etc., or chemical condition, as ionic concentration, electrolytic conductivity, etc.

In Fig. 2 T represents a thermo-couple subjected to the temperature to be controlled, as the temperature of the furnace. The thermo-couple is in circuit with the galvanometer G, whose moving coil is the coil 20 of Fig. 1, the thermo-couple and galvanometer being associated with a potentiometer circuit including the battery or source of current $a$, current adjusting rheostat $b$, and suitable resistances $c$ and $d$, together with the slide wire resistance R, which, as heretofore described, may be mounted upon the disk 31 of Fig. 1, the galvanometer and thermo-couple circuit terminating in the fixed brush or contact 32 in engagement with the movable slide wire R. Rotating at uniform speed suitably lower than the speed of the shaft 4 is the commutator A, which may be mounted upon the shaft 40, and upon which bears the brush $e$, connected to the thermo-couple T, and the brushes $f$ and $h$, the brush $f$ connecting with the aforesaid brush 32. The brushes e and f are connected to each other by one of the commutator segments for preferably more than half the time, and when so connected the apparatus of Fig. 1 and the control circuit thus far described of Fig. 2 cooperate in well known manner, as described in the aforesaid Letters Patent, the thermo-couple T delivering an electro-motive-force varying with the temperature of the furnace, causing galvanometer deflections to the right or the left and so causing the apparatus to automatically rebalance itself, by movement of the slide wire R, for the then temperature of the furnace, whether it be normal or different from normal temperature desired.

To prevent the apparatus merely maintaining balance for the temperature of the furnace as it varies, and to cause it to be periodically unbalanced in such way as to cause, through means hereinafter described, the application of heat energy to the furnace at a rate to ensure its rise or descent to normal or desired temperature within a suitable or desired length of time, there is periodically brought into the circuit of the galvanometer G and thermo-couple T by commutator A, when brushes h and e are in communication with each other through a contact of the commutator A in the position indicated in Fig. 2, the second potentiometer comprising the battery or source of current i, current adjusting rheostat j, and the slide wire resistance R1 which as heretofore stated, is mounted upon the disk 31 and therefore rotates with the main potentiometer slide wire R whenever clutch arm 6 is controlled by galvanometer needle 19 and later actuated by one of cams 30, Fig. 1, to rotate disk 9 and shaft 10. The slide wire R1 is split or divided into two parts k and m whose adjacent ends come close together upon the periphery of the disk 31 so that but slight movement thereof will cause the brush 33 to leave one part, as m, and immediately engage the adjacent end of the other part, as k. Interpolated between the adjacent ends of the slide wire parts k and m are the end coils or resistances n and o, between which connects a conductor p connecting with the aforesaid brushes f and 32. The brush 33 connects by conductor q and the brush h by conductor r with another commutator, later to be described. For present purposes it may be assumed that the conductors r and q connect with each other, in which case, with the commutator A in the position indicated, the second potentiometer whose slide wire is R1 is in series with the galvanometer G. With the slide wire R rotated to that position with respect to brush 32 corresponding with the desired or normal temperature, the simultaneous position of the brush 33 with respect to slide wire R1 is that indicated, namely, at the mid position. Accordingly, when the furnace is at other than normal temperature and the apparatus automatically balances itself for that temperature, when the second potentiometer is not in circuit, the commutator A soon thereafter brings it into circuit, with the result that there is introduced into the circuit of the galvanometer G, due to displacement of the slide wire R1 from the position shown in Fig. 2 resulting from such balancing by slide wire R, an electro-motive-force co-acting with the electro-motive-force of the thermo-couple T, such additional or control electro-motive-force being of a magnitude dependent upon the then departure of the furnace temperature from the desired or normal temperature. That is to say, the further the temperature of the furnace from desired or normal temperature, the further will the brush 33 be from mid position upon slide wire R1, with consequent greater electro-motive-force co-acting with the electro-motive-force of the couple T. For all temperatures below normal or desired temperature the brush 33 will contact only with one part of slide wire R1, as for example, k; and for all temperatures above normal or desired temperature the brush 33 will always be in engagement with the other part, as m. Thus, with the furnace below normal temperature and brush co-acting with slide wire k, there is introduced into the circuit of the galvanometer G an electro-motive-force assisting that of the thermo-couple T for the then temperature of the furnace, and the apparatus then automatically balances itself for this new electro-motive-force as if the furnace were in fact at a higher temperature. The apparatus again eventually balances itself while the second potentiometer is in circuit and thereafter, by action of the commutator A, the second potentiometer is switched out of circuit, leaving the main potentiometer having slide wire R only in circuit. The apparatus therefore accordingly again balances itself at the then or true temperature of the furnace. In so rebalancing itself it causes, by means hereinafter described, a change in the rate of application of heat, such change generally being in the direction of increase of rate of heat delivery to the furnace, when the furnace is below normal temperature, causing the temperature of the furnace to rise further.

It will therefore be understood that there is a succession of cycles each beginning at a time when the apparatus has balanced for the then temperature of the furnace; the second potentiometer is then brought into circuit and introduces an electro-motive-force and produces a "set-up" or controlling electro-motive-force whose magnitude depends upon the then departure of the furnace temperature from the desired or normal temperature; the second potentiometer is then removed from circuit, and the apparatus again rebalances itself for the then temperature of the furnace, and in so rebalancing itself controls the application of heat to the furnace in such wise that by the successive cycles of operation described the furnace is brought to or toward desired temperature.

The mode of operation as thus far described would cause slower approach to desired temperature as the departure of the furnace from desired temperature became less and less. To ensure the approach and attainment of desired or normal temperature at suitable rapid rate the resistances $n$ and $o$ are inserted between the adjacent ends of the slide wire portions $k$ and $m$, with the result that even when the brush 33 is near the adjacent ends of resistances $k$ and $m$ the electro-motive-force introduced by the second potentiometer will be materially greater than if the resistances $n$ and $o$ were absent, therefore maintaining, even when the desired temperature is closely approached, a relatively great unbalancing when the second potentiometer is in circuit, causing relatively greater movement of the apparatus in rebalancing itself when the second potentiometer is again out of circuit, and therefore causing relatively great rate of application or diminution of heat supplied to the furnace up to the time the desired or normal temperature is reached.

If the hunting or over-shooting is to be minimized, the resistances $n$ and $o$ are omitted. But in order that too great a time shall not be consumed in reaching the desired or normal temperature. it is preferred that these resistances be employed for purposes above stated, and the slight hunting or over-shooting incident to their employment is in most cases not disadvantageous.

The greater the current flowing through the second potentiometer from the battery $i$, the greater will be the electro-motive-force introduced thereby into the galvanometer circuit. Therefore by adjusting the rheostat $j$ the magnitude of the correcting or controlling electro-motive-force may be made anything suitable or desirable, and in a general way will control the rate of approach to the desired or normal temperature. The rheostat $j$ may be adjusted to suit the control to the characteristics of the particular furnace under control.

In Fig. 2 there is indicated a further commutator B controlling connection of two at a time of the three potentiometer slide wires R2, R3 and R4 with the second potentiometer whose slide wire is R1. The commutator B rotates at one-third the speed of commutator A, and may, accordingly, as indicated in Fig. 1, be mounted upon the slower speed shaft 39. The slide wires R2, R3 and R4 are those of three potentiometers or a three-branch potentiometer having the source of current or battery $s$, the magnitude of the current through the slide wires being adjustable by the rheostat $t$.

In the position of the commutators indicated in Fig. 2 there is in series with the second potentiometer parts of the slide wires R2 and R3, while R4 is out of circuit. The commutator B therefore brings two of the slide wires at a time into circuit with the second potentiometer, different pairs of these three slide wires being brought successively into circuit with the second potentiometer.

The slide wires R2, R3 and R4 are mounted, respectively, on independent wheels or disks 45, 46 and 47 loose upon the shaft 10. Each of these disks may be clutched to the shaft 10 or held fixed or at rest by clutching to a fixed element, and each may, after turning with the shaft 10 and when freed therefrom, be returned to normal or zero position. Means for accomplishing these functions may be more clearly understood by reference to Figs. 5 and 6, where one of the disks and its control apparatus is disclosed, it being understood that the other two are similarly equipped.

In Figs. 5 and 6 the disk 45, carrying slide wire R2, has on one face the iron disk 48 forming the yoke or back armature for the electro-magnets 49 co-acting with the armature disk 50 secured to the shaft 10. On its other face the disk 45 carries the back armature or yoke 51 carrying the electro-magnets 52, 52 co-acting with the disk armature 53, through which the shaft 10 freely passes and which is held fixed or stationary by any suitable means, such, for example, as the rods 54, Fig. 1. While the magnets 49 and 52 are shown in Fig. 5 as similarly placed wth respect to the disk 45, the pairs of magnets are preferably staggered as indicated in Fig. 6. When magnets 49 are energized, the disk 45 is gripped to the armature 50, which rotates with the shaft 10, the disk 45 accordingly being rotated with the shaft 10 moving the slide wire R2 with respect to its stationary brush $u$. When the magnets 49 are deenergized and the magnets 52 energized the disk 45 will be held fixed in the position to which rotated by the shaft 10. When the magnets 52 are deenergized and the solenoid 55 is energized, the latter pulls downwardly in opposition to spring 56 upon lever 57 pivoted at 58 causing the roller 59 carried on one end of the lever 57 to engage one or the other of the inclined surfaces 60 formed within the member 61 secured to the disk 45. Accordingly, energization of the solenoid 55 rotates the disk 45 backwardly to a predetermined zero or normal position, which it takes with great nicety in view of the structure of member 61 at its surfaces 60 in co-action with the roller 59.

In Fig. 1 the fixed and rotating armature disks co-acting with disk 46 are indicated at 62 and 63, respectively, and their co-acting magnets are indicated at 64 and 65, respectively; and its resetting solenoid is indicated at 66. And similarly, the fixed and rotating armature disks co-acting with disk 47 are indicated at 67 and 68, respectively, and their co-acting magnets at 69 and 70, respectively, and the resetting solenoid at 71.

A system of control for the clutch magnets and resetting solenoids is indicated in Fig. 4. A commutator C, secured upon the shaft 39 with commutator B, as indicated in Fig. 1, and the commutator D rotating at the same speed as commutator A and secured therewith upon shaft 40, Fig. 1, co-operate in controlling the disks 45, 46 and 47, the commutator D making three revolutions for each revolution of the commutator C. One terminal of the battery or other source of current 72 connects with brushes bearing, respectively, upon commutators C and D. The other terminal of the source 72 connects with one terminal of each of the clutch magnets 49, 52, 64, 65, 69 and 70. The other terminals of each of the clutch magnets 49, 65 and 70, which cause their disks to be clutched to the shaft 10, are connected, respectively, to different brushes bearing upon the commutator C which causes energization of these clutch magnets for the different disks in succession. The magnets 52, 64 and 69 for clamping their disks at rest in position to which rotated by shaft 10 are each for a third revolution of commutator C, or one complete revolution of commutators D and A, energized directly through the commutator C from battery 72. But for an additional fraction of cycle of the commutator D these magnets are respectively energized through relays 73, 74 and 75 and commutator C, the windings of the relays 73, 74 and 75 being energized from the battery 72 through the circuits controlled by the relay 76 controlled by commutator D, the relays 73, 74 and 75 being energized when relay 76 is deenergized. The resetting solenoids 55, 66 and 71 are dissimultaneously energized through commutator C and relay 77 whose winding is energized and deenergized with winding of relay 76 by commutator D.

For an illustration of the variation with time of the magnitude of the condition to be controlled, as utilized in connection with the operation of the disks 45, 46 and 47, reference may now be had to Fig. 8, wherein L is a curve whose ordinates are magnitudes of the condition and whose abscissæ are time. In the particular example illustrated, the condition whose magnitude is varying is temperature, it being understood that the description applies equally well when the condition is other than temperature.

The increments of time, $\Delta t$, are equal and constant. During the first time increment, $\Delta t$, the change in temperature between the points $a$ and $b$ is $\Delta y1$, and, as well known, $\frac{\Delta y1}{\Delta t}$ is representative of the rate of change of temperature at the time $t1$ mid-way of the first time interval $\Delta t$. Similarly, at the end of the second time interval $\Delta t$ the temperature is further changed, between the points $b$ and $c$, by an amount $\Delta y2$; and $\frac{\Delta y2}{\Delta t}$ is representative of the rate of change of temperature at the time of $t2$ mid-way in the second time interval $\Delta t$. The difference between the rates of change of temperature at the times $t2$ and $t1$ is $\frac{\Delta y2}{\Delta t} - \frac{\Delta y1}{\Delta t}$, and therefore the second derivative, or rate of change of the rate of change of temperature, is represented by $\left(\frac{\Delta y2}{\Delta t} - \frac{\Delta y1}{\Delta t}\right)\frac{1}{\Delta t}$, which may also be written as $\frac{1}{(\Delta t)^2}(\Delta y2 - \Delta y1)$. Since $\Delta t$ is constant, $(\Delta y2 - \Delta y1)$ may be considered as representative of the second derivative of temperature with respect to time. In the description of the cycle of operations which follows, it will be shown that the displacement of one of the disks 45, 46, 47 is representative of $\Delta y1$, and the displacement of a succeeding disk is representative of $\Delta y2$, and the algebraic difference of these displacements will therefore be representative of the second derivative of temperature with respect to time, that is, representative of the magnitude of the rate of change of the rate of change of temperature with respect to time.

The cycle of operations of each of the disks 45, 46 and 47, though their cycles are dephased by one complete cycle of the commutator A, is as follows:

Taking disk 45, for example, its magnets 49 are energized and clutch it to the shaft 10 just before the commutator A, Fig. 2, brings the brushes $e$ and $h$ into electrical communication with each other, that is, just before the second potentiometer slide wire R1 is interpolated into the circuit of the galvanometer G; and it remains clutched to the shaft 10 for a time corresponding with a whole revolution of the commutator A, that is, throughout the period during which the second potentiometer is in the circuit of the galvanometer G and throughout the succeeding period when the main slide wire R only is in circuit with the galvanometer G and the apparatus is rebalanced for the then temperature of the furnace. The magnets 49 are then deenergized and the magnets 52 energized, clutching the disk 45 to the stationary member 53 and so holding the disk 45 in the position to which it has been rotated by the shaft 10. The magnets 52 continue to be energized for a time corresponding with a further complete revolution of the commutator A, and in addition for a further fraction of the time of a complete revolution of the commutator A, such fraction being equal to the time during which the second potentiometer is in circuit with the galvanometer G, that is, for the time during which the brushes $e$ and $h$ are in electrical communication with each other. It is during the part of the time the disk 45 is clutched at rest that its deflected slide wire R2 co-acts with either of the other deflected slide wires R3 or R4. Immediately after deenergization of the magnets 52 the solenoid 55 is energized, returning the disk 42 to its normal or zero position, corresponding with the position indicated in Fig. 2, namely, with the brush $u$ at the middle of the resistance R2. Somewhat later the clutch magnets 49 are again energized for the beginning of a second cycle of the disk 45.

And so in sequence the other disks 46 and 47 are clutched to the shaft 10 and deflected under control of the galvanometer G, then held at rest in deflected positions, and then reset to normal positions indicated in Fig. 2.

The result of this mode of operation is that one of the slide wires, as R2, is deflected from its normal or midposition, indicated in Fig. 2, an amount proportional to the change in the actual temperature of the furnace during the time interval in which disk 45, on which resistance R2 is mounted, is clutched to shaft 10. This time interval corresponds with the time interval denoted by $\Delta t$, in the previous discussion of the second derivative, and the change in position of the resistance R2 during said time interval is proportional to the change in temperature previously denoted by $\Delta y1$. At the end of the above mentioned time interval the slide wire is clamped fast at its then deflected position, and a similar cycle of operations is performed on another of the disks, as, for example, that carrying the slide wire R3. In other words, resistance R3 partakes of the motion of the shaft 10 for a time interval $\Delta t$, is deflected from its normal or mid-position by an amount corresponding with $\Delta y2$, and is then held stationary at its deflected position. As a result of the above operations upon resistances R2 and R3, each of them is held deflected from its normal or mid-position, the deflections from said normal or mid-position being proportional to the changes in temperature during two successive equal intervals of time; and the potential difference between the contacts $u$ and $v$, respectively engaging the slide wires R2 and R3, is proportional to the algebraic difference of these displacements, represented by $\Delta y2 - \Delta y1$, and is therefore proportional to the rate of change of the rate of change of temperature, that is, proportional to the second derivative of temperature with respect to time.

During this time that both slide wires R2 and R3 are at rest in their deflected positions, they are brought into circuit with the galvanometer G with the potentiometer and impress upon the galvanometer circuit an additional controlling or corrective electromotive-force which is equal to the algebraic difference of the potential differences corresponding with the deflections of the slide wires R2 and R3. Or, more simply stated, there is impressed upon the circuit of the galvanometer G simultaneously with the electro-motive-force due to the second potentiometer an electro-motive-force equal to the difference of potential between the brushes $u$ and $v$ while slide wires R2 and R3 are at rest in their deflected positions. Thereafter, slide wires R3 and R4 similarly co-act; and later slide wires R4 and R2 similarly co-act in impressing a control electromotive-force upon the circuit of the galvanometer G. Thus, two of the slide wires R2, R3 and R4 are simultaneously at rest and in circuit with the second potentiometer; and in each successive cycle a different pair of these slide wires is at rest and in circuit with the second potentiometer.

Each of these three slide wires R2, R3 and R4 produces one of the two simultaneously acting component of electro-motive-force or potential difference impressed upon the circuit of the galvanometer G. Each component is proportional to or dependent upon the actual temperature change of the furnace during a complete cycle of co-action of the second potentiometer with the slide wire R and the operation of the slide wire R alone. These electro-motive-forces of the two slide wires are so combined that their algebraic difference is the composite electro-motive-force so impressed upon the galvanometer circuit. In consequence these component electro-motive-forces represent differences in temperature changes in immediately adjacent or succeeding cycles, and their difference is therefore representative of the second derivative of the temperature magnitude with respect to time, or, broadly, a representative of the second derivative of the magnitude of the condition, whether electrical, thermal, chemical or otherwise, with respect to time. In different words, this composite electro-motive-force is representative of the rate of change of the rate of change of the magnitude of the condition, or, specifically, is representative of the rate of change of the rate of change of temperature. Hence the slide wires R2, R3 and R4 may be termed second derivative slide wires or devices.

If the rate of approach of the furnace to normal temperature were constant, that is, if the temperature-time curve were a straight line, the net effect of the movement of two of the second derivative slide wires for two successive cycles would be zero as regards the composite electro-motive-force impressed upon the circuit of the galvanometer G, because the change in temperature in each of the two successive cycles would be the same, and the difference of the electro-motive-forces due to the second derivative slide wires would be zero. However, such constant rate of approach is practically impossible for any considerable length of time due to the heat capacity and other thermal characteristics of the furnace and the rate of change of temperature of the furnace changes with time.

When the rate of temperature change of the furnace is growing or becoming less, with the furnace temperature below normal, the second derivative slide wires introduce a composite corrective or controlling electro-motive-force of such magnitude and direction that the rate of temperature change is prevented from continuing to grow or become less and compelled to grow or become greater; and similarly, if the rate of temperature change is growing greater, the second derivative slide wires introduce a composite electro-motive-force of such magnitude and direction as to prevent the rate of temperature change from continuing to become or grow greater, and causes it to become or grow less.

In general, when the temperature of the furnace is below normal, the second potentiometer, whose slide wire is R1, effects such a control as always to cause application of more heat to the furnace, because the electro-motive-force introduced into the circuit of the galvanometer G by the second potentiometer is always one added to the electro-motive-force of the thermo-couple T. When the second potentiometer is acting, the time-temperature curve may have a portion in which the rate of change of the rate of temperature change is either negative or positive. When the rate of change of rate of temperature change is negative, the second derivative slide wires introduce a composite electro-motive-force which is added to that of the second potentiometer, so introducing a corrective electro-motive-force greater than that due to the second potentiometer alone, and therefore causing a still greater input of heat into the furnace, which therefore tends more quickly to arrive at desired or normal temperature. Again, when the rate of change of rate of temperature change is positive, the second derivative slide wires introduce a composite electro-motive-force which opposes that of the second potentiometer and slows up the introduction of heat into the furnace, and sufficiently in advance of attainment of normal temperature to prevent undue over-shooting, except as caused or allowed by the end coils $n$ and $o$ of the second potentiometer, if these end coils be employed.

In case the temperature of the furnace is above normal or desired temperature and is to be lowered to normal or desired temperature, the part $m$ of the second potentiometer slide wire R1 co-acts with brush 33 and introduces into the circuit of the galvanometer G an electro-motive-force opposing that due to the thermo-couple T, and the main slide wire R is then so affected as to cause a reduction in the rate of supply of heat to the furnace. With the furnace temperature so above normal and the rate of change of the rate of temperature change is positive, the second derivative slide wires introduce an electro-motive-force assisting that of the second potentiometer in opposing the electro-motive-force of the thermo-couple T, and so intensify or increase the reduction in application of heat to the furnace. And when, with the furnace temperature above normal, the rate of change of the rate of temperature change is negative, the second derivative slide wires introduce an electro-motive-force opposing that of the second potentiometer and assisting that of the thermo-couple, and so slacken the reduction in application of heat to the furnace.

For controlling the application of the agent which modifies the magnitude of the condition to be controlled, or, specifically, for controlling the application of heat to the furnace to control its temperature, any suitable means may be employed. For example, loose upon the shaft 10, Fig. 1, may be a wheel or pulley 78, and similarly to disk 45, may be provided with magnets 79, 79 for clutching it to the fixed armature or disk 80 and with the magnets 81 for clutching it to the armature or disk 82 secured upon and rotating with the shaft 10. By cord, chain or other suitable means 83, the disk 78 when clutched to the shaft 10 will rotate the smaller pulley 84 secured upon a shaft 85 upon which is secured a slide wire disk 86 upon which is a slide wire 87, with which co-acts the stationary brush 88.

Referring now to Fig. 3, the slide wire 87 constitutes two arms of a Wheatstone bridge, the position of the slide wire 87 with respect to brush 88 determining the relative magnitudes of the resistances in the two arms. The other two arms of the bridge are constituted by the slide wire 89, with which co-acts the stationary brush 90, the brush 90 and the slide wire 89 being again indicated at the upper left corner of Fig. 3 in association with the driven member of the fuel or heat control device. As source of current for the bridge described may be employed the battery or source of current $x$. The brushes 88 and 90 form the terminals of a conjugate conductor in which is connected the galvanometer coil $y$ which, as indicated in Fig. 1, is disposed between the poles of a permanent magnet $z$ and carries the needle or pointer 91 disposed between the two conducting disks or wheels 92 and 93 insulated from each other and driven by the shaft 94 geared at 95 to the continuously rotating shaft 4, whereby as the coil $y$ deflects the needle 91 to one side or other, it contacts with a conducting disk or wheel and establishes therewith a stable or firm electrical connection or contact. Bearing upon each wheel or disk element 92 and 93 are brushes 96 and 97 for maintaining electrical communication therewith.

The galvanometer coil $y$ and its associated parts described constitute a polarized relay, the high resistances 98 and 99 shunting the contact between the needle 91 and the disks 92 and 93 to prevent undue arcing or sparking when they separate.

A commutator E, Figs. 1 and 3, may be disposed upon the shaft 40 and rotate at the same speed with commutators A and D. One terminal of a battery or other source of current $a1$ connects with a brush bearing upon the commutator E; another of the brushes controls a circuit of the magnet 81 which clutches the wheel 78 to the shaft 10. Another brush causes energization of the magnet 79, which clutches the wheel 78 to the fixed armature 80.

The galvanometer needle 91 is connected through the commutator E with one terminal of the battery $a1$ whose other terminal connects with one terminal of the winding of each of the relays 100 and 101, the other terminals of the relay windings connecting, respectively, with the rotating disks 92 and 93 through brushes 96 and 97. The relays when energized cause flow of current from the power supply wires 102 and 103 through one or the other of the series fields 104 and 105 of the electric motor M1, whose armature 106 is in series with that one of the series fields 104 or 105 which may be in circuit, the fields 104 and 105 being so wound or connected that they produce, respectively, magnetic fields in opposite senses, so that the armature 106 will rotate in one direction when one field is energized and in opposite direction when the other is energized.

The current supplied to the motor M1 passes through a resistance 107 in shunt to which is the relay winding 108, which when deenergized allows its armature 109 to close circuit from the battery $a1$ through the brake magnet or solenoid 110 which when energized applies a brake to the motor M1 and holds it at rest.

The armature 106 of the motor M1 may drive any suitable device, as the movable member of a valve, for controlling the flow of fuel, or any gas or liquid whose quantity or rate of supply affects the condition whose magnitude is to be controlled. In the example illustrated the armature 106 drives the worm 111, which in turn drives the gear 112 driving the worm 113 meshing with the worm gear 114 which rotates the shaft or stem 115 of a valve V, which controls liquid or gaseous fuel delivered to the furnace, or which controls the flow of any other gas, vapor or liquid which affects the condition of control. Or the member 115 may be the movable member of a rheostat controlling the input of electric current into an electric furnace, or of any other device to control any other electrical, mechanical or chemical device. On the shaft 115 may be a pinion 116 driving the gear 117 at considerably lower rate, whereby the disk $89^a$ carrying the slide wire 89 may rotate not more than a revolution for a plurality of revolutions of the shaft 115.

The commutator E is so positioned upon the shaft 40 that it causes energization of the clutch magnets 81 to clutch wheel 78 to shaft 10 just before the commutator A brings brushes $e$ and $f$ into electrical communication with each other, that is, just before the second potentiometer and the second derivative slide wires are cut out of the circuit of or rendered ineffective upon the galvanometer G. The wheel 78 remains clutched to the shaft 10 until just before the second potentiometer and second derivative slide wires are brought back into the circuit of the galvanometer G. Accordingly the wheel 78 and the disk 86 rotate only while the apparatus is automatically balancing itself for the actual then temperature of the furnace, the apparatus then being under control of the main slide wire R only. The magnet 79 which clutches the wheel 78 at rest in its deflected position is energized all the time the magnet 81 is deenergized.

Accordingly, during the latter part of each cycle, as effected by the commutator A, that is, after the second potentiometer and the second derivative slide wires are out of circuit and the main slide wire R only is in circuit with the galvanometer G, the slide wire 87 is moved with respect to its brush 88, the angular movement of the slide wire 87 being magnified by the large pulley 78 and small pulley 84, and unbalances the Wheatstone bridge 87, 89, which was formerly in balance. The result is that the galvanometer coil $y$ will deflect in the one direction or the other and bring its needle 91 into engagement with one or the other of the disks 92 or 93, causing energization of one or the other motor fields 104 and 105, causing rotation of the motor M1 in one direction or the other, and therefore actuation of the valve V or other mechanism in the one direction or the other. As the motor M1 rotates, however, the second slide wire 89 of the bridge is moved with respect to its brush 90 in such direction as to re-balance the bridge, whereby after predetermined rotation of the actuated member 115 the bridge will again be automatically balanced and the needle 91 will open the circuit of the relays controlling the motor M which, being deenergized, will cause the brake magnet 110 to set the brake to hold the motor M and the structure 115 at rest.

Accordingly, the mechanism is such that the motor M will be rotated in the one direction or the other and to an extent depending upon the extent of rotation of the shaft 10 under control of the circuits of Fig. 2, whereby the rate of application of the agent, as fuel, heating current or the like, will be controlled in accordance with direction of movement of the shaft 10 and in extent depending upon extent of movement of the shaft 10.

The operation is, briefly, as follows:

The thermo-couple T is subjected to the temperature of the furnace and produces an electro-motive-force varying with the furnace temperature. This electro-motive-force is impressed upon the main potentiometer, whose slide wire is R, and causes deflection of the needle of the galvanometer G in one direction or the other according as the temperature is rising or falling, and the apparatus automatically moves the slide wire R with respect to its brush 32 to reestablish a balance. The apparatus therefore automatically rebalances itself for the different temperatures partaken of by the furnace.

After such a balance is effected, the second potentiometer and the second derivative slide wires are brought into the circuit of the galvanometer with the thermo-couple T, introducing into the galvanometer circuit an electro-motive-force having a component, due to the second potentiometer, whose magnitude is dependent upon the then departure of the furnace temperature from the desired or normal temperature, and another component due to the second derivative slide wires and dependent upon the second derivative of temperature with respect to time, or dependent upon the rate of change of the rate of temperature change. The apparatus then rebalances itself, and so reaches the end of the first part of a cycle, and during this part of the cycle the rate of application of heat to the furnace is not changed. During the second part of the cycle the second potentiometer and the second derivative slide wires are rendered ineffective, and the apparatus again automatically balances itself for the then temperature of the furnace, and during this second part of the cycle the control of heat supply to the furnace is effective. And the continuous operation comprises a succession of such cycles. The effect produced by the second derivative slide wires is dependent upon the algebraic difference of electro-motive-forces corresponding with the actual temperature changes of the furnace in two successive cycles immediately preceding the cycle in which the second derivative effect or control co-acts with the second potentiometer.

Since the position of the brush 33 of the second potentiometer corresponds with normal or desired temperature, by shifting the brush 33 the normal or desired temperature of the furnace which the apparatus automatically attains and maintains may be changed at will. Program control may accordingly be effected by shifting the brush 33 either manually or automatically.

The brush 33 may move automatically according to any desired program by structure such as indicated in Fig. 7, or the equivalent thereof.

In this figure the brush 33 is carried by a member movable in the curved slot 118, the slot being concentric with the disk 45, so that brush 33 will always bear upon the slide wire R2. The cam 119 is rotated by any suitable means, as for example, clockwork or the motor M, at suitably slow rate, and in revolving moves the brush 33 in opposition to spring 120. The outline or shape of the cam may be anything suitable or desirable, and corresponds with or represents the program of the control to be effected.

While for control of the galvanometer G potentiometers are preferred, as described, it shall be understood that for any or all of said potentiometers may be employed a Wheatstone bridge or any other suitable or equivalent device in association with device of suitable character, in lieu of the thermo-couple T, producing an electrical effect corresponding with or representative of the condition whose magnitude is to be controlled. And in lieu of the Wheatstone bridge employed for controlling the valve, rheostat or other device effecting the application of heat or other agent may be employed any other suitable or equivalent circuit arrangement or device.

What I claim is:

1. The method of producing or maintaining a predetermined temperature, which consists in producing an electrical effect whose magnitude is representative of the temperature, effecting a flow of heat for varying the temperature, producing an electrical effect whose magnitude is representative of the rate of change of temperature, and causing said electrical effects to co-act in controlling the rate of heat flow.

2. The method of temperature control, which consists in producing an electro-motive-force whose magnitude is representative of the temperature, controlling thereby the flow of heat for varying the temperature, controlling by said electro-motive-force the production of an opposing effect for reducing to zero the control of said electro-motive-force upon the heat flow, producing a second electro-motive-force whose magnitude corresponds with the magnitude of departure of the then temperature from a predetermined temperature, and modifying by said second electro-motive-force the control by said first electro-motive-force of the rate of heat flow.

3. The method of producing or maintaining a predetermined magnitude of a condition, which consists in applying an agent for varying the magnitude of said condition, producing an effect representative of the magnitude of the second derivative of the magnitude of said condition with respect to time, and controlling the rate of application of said agent by said effect.

4. The method of producing or maintaining a predetermined magnitude of a condition, which consists in applying an agent for varying the magnitude of said condition, producing an electrical effect representative of the magnitude of the second derivative of the magnitude of said condition with respect to time, and controlling the rate of application of said agent by said electrical effect.

5. The method of producing or maintaining a predetermined magnitude of a condition, which consists in applying an agent for varying the magnitude of said condition, producing an effect corresponding with the departure from said predetermined magnitude of the condition, producing a second effect representative of the magnitude of the second derivative of said magnitude with respect to time, and controlling the rate of application of said agent by the resultant of said effects.

6. The method of producing or maintaining a predetermined magnitude of a condition, which consists in applying an agent for varying the magnitude of said condition, producing an electrical effect corresponding with the departure from said predetermined magnitude of the condition, producing a second electrical effect representative of the magnitude of the second derivative of said magnitude with respect to time, and controlling the rate of application of said agent by the resultant of said electrical effects.

7. The method of controlling temperature, which consists in producing a flow of heat for changing the temperature, producing an effect representative of the second derivative of temperature with respect to time, and controlling thereby the rate of heat flow.

8. The method of controlling temperature, which consists in producing a flow of heat for changing the temperature, producing an electrical effect representative of the second derivative of temperature with respect to time, and controlling thereby the rate of heat flow.

9. The method of controlling temperature, which consists in producing a flow of heat for changing the temperature, producing an effect whose magnitude corresponds with departure from the predetermined temperature, producing a second effect representing the second derivative of temperature with respect to time, and controlling the rate of heat flow by said effects.

10. The method of controlling temperature, which consists in producing a flow of heat for changing the temperature, producing an electrical effect whose magnitude corresponds with departure from the predetermined temperature, producing a second electrical effect representing the second derivative of temperature with respect to time, and controlling the rate of heat flow by said electrical effects.

11. The method of controlling temperature, which consists in producing a flow of heat for changing the temperature, producing an electro-motive-force dependent upon the temperature at a given time, producing a second electro-motive-force representative of the second derivative of temperature with respect to time, and controlling the rate of heat flow by the resultant of said electro-motive-forces.

12. The method of controlling temperature, which consists in producing a flow of heat for varying the temperature, producing an electro-motive-force representative of the temperature at a given time, producing a second electro-motive-force representative of the departure of the temperature at said time from a predetermined temperature, producing a third electro-motive-force representative of the second derivative of temperature with respect to time, and controlling the rate of heat flow by said three electro-motive-forces.

13. The method of controlling temperature, which consists in producing a flow of heat for varying the temperature, producing an electro-motive-force representative of the temperature at a given time, producing a second electro-motive-force representative of the departure of the temperature at said time from a predetermined temperature, producing a third electro-motive-force constituting the algebraic difference between electro-motive-forces representative of the magnitudes of two successive temperature changes, and controlling the rate of heat flow by said three electro-motive-forces.

14. The method of controlling the magnitude of a condition, which consists in applying an agent for varying said magnitude, and varying the application of said agent by successive cycles of control, each cycle comprising the production of an electrical control factor whose magnitude corresponds with the magnitude of the departure of the magnitude of said condition from a predetermined magnitude, effecting thereby an unbalancing of the control system, and rebalancing the control system to correspond with the then magnitude of said condition.

15. The method of controlling the magnitude of a condition, which consists in applying an agent for varying said magnitude, and varying the application of said agent by successive cycles of control, each cycle comprising the production of an electrical control factor whose magnitude corresponds with the magnitude of the departure of the magnitude of said condition from a predetermined magnitude, effecting thereby an unbalancing of the control system, and rebalancing the control system to correspond with the then magnitude of said condition, control of the application of said agent occurring during said rebalancing of the control system.

16. The method of controlling the magnitude of a condition, which consists in applying an agent for varying said magnitude, and varying the application of said agent by successive cycles of control, each cycle comprising the production of an electrical control factor whose magnitude corresponds with the magnitude of the departure of the magnitude of said condition from a predetermined magnitude, effecting thereby an unbalancing of the control system, producing a second control factor co-acting with said electrical control factor and representing the second derivative of said magnitude with respect to time, and rebalancing the control system to correspond with the then magnitude of said condition.

17. The method of controlling the magnitude of a condition, which consists in applying an agent for varying said magnitude, and varying the application of said agent by successive cycles of control, each cycle comprising the production of an electrical control factor whose magnitude corresponds with the magnitude of the departure of the magnitude of said condition from a predetermined magnitude, effecting thereby an unbalancing of the control system, producing a second electrical control factor co-acting with said first electrical control factor and comprising the algebraic difference between component electrical control factors representing, respectively, the changes of said magnitude during successive preceding cycles, and rebalancing the control system to correspond with the then magnitude of said condition.

18. An automatic system for producing or maintaining a predetermined magnitude of a condition, comprising means responsive to departure from said predetermined magnitude, means for applying an agent for varying the magnitude of said condition, means controlled by said first named means producing an electrical control factor, means producing a control factor representative of the magnitude of the second derivative of said magnitude with respect to time, and means responsive to said control factors controlling said means for applying said agent.

19. An automatic system for producing or maintaining a predetermined magnitude of a condition, comprising means responsive to departure from said predetermined magnitude, means for applying an agent for varying the magnitude of said condition, means controlled by said first named means producing an electrical control factor whose magnitude is dependent upon departure from said predetermined magnitude, means producing a control factor representative of the magnitude of the second derivative of said magnitude with respect to time, and means responsive to said control factors controlling said means for applying said agent.

20. An automatic system for producing or maintaining a predetermined magnitude of a condition comprising means for producing a control factor representative of the magnitude of the second derivative of said magnitude with respect to time, means for applying an agent for varying said magnitude, and means controlled by said control factor for controlling said means for applying said agent.

21. An automatic system for producing or maintaining a predetermined magnitude of a condition, comprising means responsive to departure from said predetermined magnitude, means for applying an agent for varying the magnitude of said condition, means controlled by said first named means producing an electrical control factor, means controlled by said first named means and said control factor for controlling said means for applying said agent, and means for varying said predetermined magnitude in accordance with a program.

22. An automatic system for producing or maintaining a predetermined magnitude of a condition, comprising means responsive to departure from said predetermined magnitude, means for applying an agent for varying the magnitude of said condition, means controlled by said first named means producing an electrical control factor, means controlled by said first named means and said control factor for controlling said means for applying said agent, and means for controlling in accordance with a program said means producing said electrical control factor.

23. An automatic system for producing or maintaining a predetermined magnitude of a condition, comprising means responsive to departure from said predetermined magnitude, means for applying an agent for varying the magnitude of said condition, means controlled by said first named means producing an electrical control factor whose magnitude is dependent upon departure from said predetermined magnitude, means producing a control factor representative of the magnitude of the second derivative of said magnitude with respect to time, means responsive to said control factors controlling said means for applying said agent, and means for varying said predetermined magnitude in accordance with a program.

24. An automatic system of temperature control comprising means for controlling heat flow for varying the temperature, means responsive to temperature changes controlling said first named means, and means producing an electrical control factor dependent upon the departure from said predetermined temperature and affecting said means responsive to temperature changes.

25. An automatic system of temperature control comprising means for controlling heat flow for varying the temperature, means responsive to temperature changes controlling said first named means, and means producing a control factor affecting said means responsive to temperature changes and representing the second derivative of temperature with respect to time.

26. An automatic system of temperature control comprising means for controlling heat flow for varying the temperature, means responsive to temperature changes controlling said first named means, means producing an electrical control factor dependent upon the departure from said predetermined temperature and affecting said means responsive to temperature changes, and means producing a second control factor affecting said means responsive to temperature changes and representing the second derivative of temperature with respect to time.

27. An automatic system of temperature control comprising means for controlling heat flow for varying the temperature, means responsive to temperature changes controlling said first named means, means producing an electrical control factor dependent upon the departure from said predetermined temperature and affecting said means responsive to temperature changes, and means for changing in accordance with a program the magnitude of the temperature to be produced or maintained.

28. An automatic system of temperature control comprising means for controlling heat flow for varying the temperature, means responsive to temperature changes controlling said first named means, means producing a control factor affecting said means responsive to temperature changes and representing the second derivative of temperature with respect to time, and means for changing in accordance with a program the magnitude of the temperature to be produced or maintained.

29. An automatic system of temperature control comprising means for controlling heat flow for varying the temperature, means responsive to temperature changes controlling said first named means, means producing an electrical control factor dependent upon the departure from said predetermined temperature and affecting said means responsive to temperature changes, means producing a second control factor affecting said means responsive to temperature changes and representing the second derivative of temperature with respect to time, and means for changing in accordance with a program the magnitude of the temperature to be produced or maintained.

30. An automatic system of temperature control comprising means for controlling heat flow for varying the temperature, means for producing an electro-motive-force whose magnitude corresponds with the temperature, means producing a second electro-motive-force whose magnitude depends upon the departure from predetermined temperature, and an instrument subjected to said electro-motive-forces and controlling said first named means.

31. An automatic system of temperature control comprising means for controlling heat flow for varying the temperature, means for producing an electro-motive-force representative of the second derivative of temperature with respect to time, and an instrument affected by said electro-motive-force and controlling said first named means.

32. An automatic system of temperature control comprising means for controlling heat flow for varying the temperature, means for producing an electro-motive-force whose magnitude corresponds with the temperature, means for producing a second electro-motive-force whose magnitude depends upon the departure from predetermined temperature, means for producing a third electro-motive-force representative of the second derivative of temperature with respect to time, and an instrument controlled by said electro-motive-forces and controlling said first named means.

33. An automatic system for producing or maintaining a predetermined magnitude of a condition, an instrument responsive to the magnitude of said condition, a movable structure controlled by said instrument, means controlled by said movable structure in turn controlling said instrument to prevent control of said movable structure by said instrument for the duration of that magnitude of said condition to which said instrument responded, means controlled by said movable structure producing an electrical control factor affecting said instrument, and means controlled by said movable structure controlling rate of application of an agent for varying the magnitude of said condition.

34. An automatic system for producing or maintaining a predetermined magnitude of a condition, an instrument responsive to the magnitude of said condition, a movable structure controlled by said instrument, means controlled by said movable structure in turn controlling said instrument to prevent control of said movable structure by said instrument for the duration of that magnitude of said condition to which said instrument responded, means controlled by said movable structure producing an electrical control factor affecting said instrument, and means controlled by said movable structure when moving under the control of said instrument when affected only by that magnitude of said condition controlling rate of application of an agent for varying the magnitude of said condition.

35. An automatic system for producing or maintaining a predetermined magnitude of a condition, an instrument responsive to the magnitude of said condition, a movable structure controlled by said instrument, means controlled by said movable structure in turn controlling said instrument to prevent control of said movable structure by said instrument for the duration of that magnitude of said condition to which said instrument responded, means controlled by said movable structure producing an electrical control factor affecting said instrument, and means controlled by said movable structure for producing a second control factor affecting said instrument and representing the second derivative of said magnitude with respect to time, and means controlled by said movable structure controlling rate of application of an agent for varying the magnitude of said condition.

36. An automatic system of temperature control comprising an instrument responsive to temperature changes, a movable structure controlled by said instrument, means controlled by said movable structure in turn controlling said instrument to prevent control of said movable structure by said instrument for the duration of that magnitude of temperature to which said instrument responded, means controlled by said movable structure producing an electrical control factor affecting said instrument, and means controlled by said movable structure controlling flow of heat for varying the temperature.

37. An automatic system of temperature control comprising an instrument responsive to temperature changes, a movable structure controlled by said instrument, means controlled by said movable structure in turn controlling said instrument to prevent control of said movable structure by said instrument for the duration of that magnitude of temperature to which said instrument responded, means controlled by said movable structure producing an electrical control factor affecting said instrument, and means controlled by said movable structure when moving under the control of said instrument when affected only by that magnitude of temperature controlling flow of heat for varying the temperature.

38. An automatic system of temperature control comprising an instrument responsive to temperature changes, a movable structure controlled by said instrument, means controlled by said movable structure in turn controlling said instrument to prevent control of said movable structure by said instrument for the duration of that magnitude of temperature to which said instrument responded, means controlled by said movable structure producing an electrical control factor affecting said instrument, means controlled by said movable structure for producing a second control factor affecting said instrument and representing the second derivative of temperature with respect to time, and means controlled by said movable structure controlling flow of heat for varying the temperature.

39. An automatic system for producing or maintaining a predetermined magnitude of a condition comprising a galvanometer responsive to changes in magnitude of said condition, a movable structure controlled by said galvanometer, means controlled by said movable structure for balancing the galvanometer for the duration of that magnitude of said condition to which the galvanometer responded, means controlled by said movable structure for producing an electro-motive-force dependent upon the departure of that magnitude of said condition from said predetermined magnitude, means for impressing said electro-motive-force upon said galvanometer to effect further control of said movable structure, and means controlled by said movable structure controlling application of an agent for varying the magnitude of said condition.

40. An automatic system for producing or maintaining a predetermined magnitude of a condition comprising a galvanometer responsive to changes in magnitude of said condition, a movable structure controlled by said galvanometer, means controlled by said movable structure for balancing the galvanometer for the duration of that magnitude of said condition to which the galvanometer responded, means controlled by said movable structure for producing an electromotive-force dependent upon the departure of that magnitude of said condition from said predetermined magnitude, means for impressing said electro-motive-force upon said galvanometer to effect further control of said movable structure, and means controlled by said movable structure when moving under the control of said galvanometer when affected only by that magnitude of said condition controlling application of an agent for varying the magnitude of said condition.

41. An automatic system for producing or maintaining a predetermined magnitude of a condition comprising a galvanometer responsive to changes in magnitude of said condition, a movable structure controlled by said galvanometer, means controlled by said movable structure for balancing the galvanometer for the duration of that magnitude of said condition to which the galvanometer responded, means controlled by said movable structure for producing an electro-motive-force dependent upon the departure of that magnitude of said condition from said predetermined magnitude, means for impressing said electro-motive-force upon said galvanometer to effect further control of said movable structure, means controlled by said movable structure producing an electro-motive-force affecting said galvanometer and representing the second derivative of said magnitude with respect to time, and means controlled by said movable structure controlling application of an agent for varying the magnitude of said condition.

42. An automatic system of temperature control comprising a galvanometer responsive to temperature changes, a movable structure controlled by said galvanometer, means controlled by said movable structure for rebalancing said galvanometer for a given temperature, means controlled by said movable structure for producing an electro-motive-force whose magnitude is dependent upon the magnitude of departure of said given temperature from a predetermined temperature, means for switching the source of said electro-motive-force into and out of circuit of said galvanometer, and means controlling the flow of heat for varying the temperature controlled by said movable structure when said source of electro-motive-force is out of the galvanometer circuit.

43. An automatic system of temperature control comprising a galvanometer responsive to temperature changes, a movable structure controlled by said galvanometer, means controlled by said movable structure for rebalancing said galvanometer for a given temperature, means controlled by said movable structure for producing an electromotive-force whose magnitude is dependent upon the magnitude of departure of said given temperature from a predetermined temperature, means controlled by said movable structure producing a second electro-motive-force representative of the second derivative of temperature with respect to time, means for switching the sources of said electro-motive-forces simultaneously into and out of circuit of said galvanometer, and means controlling the flow of heat for varying the temperature controlled by said movable structure when said sources of electro-motive-force are out of the galvanometer circuit.

44. The combination with a galvanometer and control circuit therefor, of a movable structure controlled thereby, means in said circuit controlled by said movable structure for balancing said circuit, a source of variable electro-motive-force comprising a potentiometer having a slide wire and a brush co-acting therewith, means actuated by said movable structure for causing relative movement between said slide wire and said brush, and means for switching said source of variable electro-motive-force into and out of circuit with said galvanometer.

45. The combination with a galvanometer and control circuit therefor, of a movable structure controlled thereby, means in said circuit controlled by said movable structure for balancing said circuit, a source of variable electro-motive-force comprising a potentiometer having a slide wire divided into sections and a brush co-acting therewith, means actuated by said movable structure for causing relative movement between said slide wire and said brush, whereby a variable electro-motive-force exists between said brush and the adjacent ends of said slide wire sections, and means for switching said source of variable electro-motive-force into and out of circuit with said galvanometer.

46. The combination with a galvanometer and control circuit therefor, of a movable structure controlled thereby, means in said circuit controlled by said movable structure for balancing said circuit, a source of variable electro-motive-force comprising a potentiometer having a slide wire divided into sections and a brush co-acting therewith, resistance connected between adjacent ends of said slide wire sections, means actuated by said movable structure for moving said brush and slide wire with respect to each other, whereby a variable electro-motive-force exists between said brush and a point between the ends of said resistance, and means for switching said source of variable electro-motive-force into and out of circuit with said galvanometer.

47. The combination with a galvanometer, of a potentiometer controlling the same comprising a slide wire divided into sections, a source of current in circuit with said sections, a contact co-acting with said slide wire sections, and means controlled by said galvanometer for effecting relative movement between said slide wire sections and said contact.

48. The combination with a galvanometer, of a potentiometer controlling the same comprising a slide wire divided into sections, a source of current in circuit with said sections, a contact co-acting with said slide wire sections, a source of power, a movable structure for causing relative movement between said slide wire sections and said contact, and a disengageable connection between said source of power and said movable structure controlled by said galvanometer.

49. The combination with a galvanometer and a balancing circuit therefor, of a movable structure controlled by said galvanometer, means in said circuit controlled by said movable structure for rebalancing said circuit, a plurality of sources of variable electro-motive-force, means controlled by said movable structure for adjusting said sources in succession, and means for thereafter bringing said sources simultaneously into circuit with said galvanometer.

50. The combination with a galvanometer and a balancing circuit therefor, of a movable structure controlled by said galvanometer, means in said circuit controlled by said movable structure for rebalancing said circuit, a plurality of sources of variable electro-motive-force, means controlled by said movable structure for adjusting said sources in succession, and means for thereafter switching said sources in series with each other into circuit with said galvanometer.

51. The combination with a galvanometer and a balancing circuit therefor, of a movable structure controlled by said galvanometer, means controlled by said movable structure for rebalancing said circuit, a source of variable electro-motive-force adjusted by said movable structure, three secondary sources of variable electro-motive-force, means actuated by said movable structure for adjusting said secondary sources in succession, switching means for bringing two of said secondary sources after adjustment simultaneously into circuit with said first named source, and switching means for bringing said first named source with said two secondary sources periodically into circuit with said galvanometer.

52. The combination with a galvanometer and a balancing circuit therefor, of a movable structure controlled by said galvanometer, means controlled by said movable structure for rebalancing said circuit, a source of variable electro-motive-force adjusted by said movable structure, three secondary sources of variable electro-motive-force, means actuated by said movable structure for adjusting said secondary sources in succession. switching means for bringing two of said secondary sources after adjustment simultaneously into circuit with said first named source, and switching means for bringing said first named source with said two secondary sources periodically into circuit with said galvanometer, said two of said secondary sources having been respectively adjusted while out of circuit of said galvanometer during successive cycles of said last named switching means.

53. The combination with a galvanometer and a control circuit therefor, of a movable structure controlled by said galvanometer, a member adapted to be actuated by said movable structure, means for clutching said member to said movable structure, means for holding said member at rest in position to which moved by said movable structure, and means for returning said member to normal position.

54. The combination with a galvanometer, of a source of power, a rotary structure, a clutch controlled by said galvanometer for connecting said source of power to said rotary structure, a member adapted to be actuated by said rotary structure, an electrical conductor carried thereby, a stationary device co-acting with said conductor, means for clutching said member to said rotary structure, and means for holding said member in position to which actuated by said rotary structure.

55. The combination with a galvanometer, of a source of power, a rotary structure, a clutch controlled by said galvanometer for connecting said source of power to said rotary structure, a member adapted to be actuated by said rotary structure, an electrical conductor carried thereby, a stationary device co-acting with said conductor, means for clutching said member to said rotary structure, means for holding said member in position to which actuated by said rotary structure, and means for returning said member to normal position.

56. The combination with a galvanometer, of a source of power, a rotary structure, a clutch controlled by said galvanometer for connecting said source of power to said rotary structure, a member adapted to be actuated by said rotary structure, an electrical conductor carried thereby, a stationary device co-acting with said conductor, electro-magnetic means for clutching said member to said rotary structure, electro-magnetic means for holding said member in position to which actuated by rotary structure, and electro-magnetic means for returning said member to normal position.

57. The combination with a galvanometer, of a movable structure controlled thereby, a member adapted to be actuated by said movable structure, a conductor carried by said member, a brush co-acting with said conductor, and means for shifting said brush in accordance with a program.

58. The combination with a galvanometer, of a source of power, a movable structure adapted to be actuated by said source of power, a clutch controlled by said galvanometer controlling actuation of said movable structure by said source of power, a control circuit, electrical means therein, a member for adjusting said electrical means, means for clutching said member to said movable structure, and means for holding said member in position to which moved by said movable structure.

59. The combination with a galvanometer, of a source of power, a movable structure adapted to be actuated by said source of power, a clutch controlled by said galvanometer controlling actuation of said movable structure by said source of power, a control circuit, electrical means therein, a member for adjusting said electrical means, means for clutching said member to said movable structure, means for holding said member in position to which moved by said movable structure, a second galvanometer controlled by said electrical means, a second source of power controlled by said second galvanometer, and a control member actuated by said second source of power.

60. The combination with a galvanometer, of a source of power, a movable structure adapted to be actuated by said source of power, a clutch controlled by said galvanometer controlling actuation of said movable structure by said source of power, a control circuit, electrical means therein, a member for adjusting said electrical means, means for clutching said member to said movable structure, means for holding said member in position to which moved by said movable structure, a second galvanometer controlled by said electrical means, an electro-motive device operating in opposite directions in response to deflections of said galvanometer in opposite directions, and a control member actuated by said electro-motive device.

61. The combination with a galvanometer, of a source of power, a movable structure adapted to be actuated by said source of power, a clutch controlled by said galvanometer controlling actuation of said movable structure by said source of power, a Wheatstone bridge, a member for adjusting the ratio of two arms of said bridge, means for clutching said member to said movable structure, means for holding said member in position to which actuated by said movable structure, a control member, means movable therewith for controlling the ratio of two arms of said bridge, a second galvanometer controlled by said bridge, and a motive device for actuating said control member controlled by said second galvanometer.

62. The combination with a control member, of a motor for actuating the same, a Wheatstone bridge, means movable with said control member for adjusting said Wheatstone bridge, independent means for adjusting said bridge and a galvanometer controlling said motor and controlled by said Wheatstone bridge.

63. The combination with a control member, of a motor operative in opposite directions for moving said control member in opposite directions, a Wheatstone bridge, means actuated in opposite directions by said motor for adjusting said bridge, independent means for adjusting said bridge, and a galvanometer controlled by said bridge and controlling by its deflections in opposite directions operation of said motor in opposite directions.

64. The method of temperature control, which consists in producing an effect which is a function of the rate of temperature change and of the departure of the temperature from a predetermined magnitude, and controlling by said effect the application of heat for varying the temperature.

65. The method of producing or maintaining a predetermined magnitude of a condition, which consists in producing an effect which is a function of the rate of change of the magnitude of said condition and of the magnitude of the second derivative of the magnitude of said condition with respect to time, and controlling by said effect the application of an agent for varying the magnitude of said condition.

66. The method of producing or maintaining a predetermined magnitude of a condition, which consists in producing an electrical effect which is a function of the rate of change of the magnitude of said condition and of the rate of change of said rate of change, and controlling by said effect the application of an agent for varying the magnitude of said condition.

67. The method of temperature control, which consists in producing an effect which is a function of the rate of temperature change and of the second derivative of temperature with respect to time, and controlling the flow of heat in accordance with said effect to vary the temperature.

68. The method of temperature control, which consists in producing an electrical effect which is a function of the rate of temperature change and of the second derivative of temperature with respect to time, and controlling the flow of heat in accordance with said effect to vary the temperature.

69. The method of producing or maintaining a predetermined magnitude of a condition, which consists in producing an effect which is a function of the magnitude of said condition at a given time, of the rate of change of the magnitude of said condition and of the rate of change of said rate of change, and controlling by said effect the application of an agent for varying the magnitude of said condition.

70. The method of temperature control, which consists in producing an effect which is a function of the temperature at a given time, of the rate of temperature change and of the second derivative of temperature with respect to time, and controlling in accordance with said effect heat flow for varying the temperature.

71. The method of temperature control, which consists in producing an electrical effect which is a function of the temperature at a given time, of the rate of temperature change and of the second derivative of temperature with respect to time, and controlling in accordance with said effect heat flow for varying the temperature.

72. An automatic system for producing or maintaining a predetermined magnitude of a condition, comprising means producing an electrical effect which is a function of the rate of change of the magnitude of said condition and of the rate of change of said rate of change, means controlling application of an agent for varying the magnitude of said condition, and means responsive to said effect controlling said controlling means.

73. An automatic system of temperature control comprising means controlling heat flow for varying the temperature, means producing an effect which is a function of the rate of temperature change and of the second derivative of temperature with respect to time, and means responsive to said effect controlling said heat flow controlling means.

74. An automatic system for producing or maintaining a predetermined magnitude of a condition, comprising means controlling application of an agent for varying the magnitude of said condition, means producing an effect which is a function of said magnitude at a given time, of the rate of change of said magnitude and of the rate of change of said rate of change, and means responsive to said effect controlling said controlling means.

75. An automatic system for producing or maintaining a predetermined magnitude of a condition, comprising means controlling application of an agent for varying the magnitude of said condition, means producing an electrical effect which is a function of said magnitude at a given time, of the rate of change of said magnitude and of the rate of change of said rate of change, and means responsive to said effect controlling said controlling means.

76. An automatic system of temperature control comprising means controlling the flow of heat for varying the temperature, means producing an effect which is a function of the magnitude of temperature at a given time, of the rate of change of temperature and of a second derivative temperature with respect to time, and means responsive to said effect controlling said heat flow controlling means.

77. An automatic system of temperature control comprising means controlling the flow of heat for varying the temperature, means producing an electrical effect which is a function of the magnitude of temperature at a given time, of the rate of change of temperature and of a second derivative of temperature with respect to time, and means responsive to said effect controlling said heat flow controlling means.

78. The combination with a control member, of a motor for actuating the same, a balancing circuit, means movable with said control member for adjusting said balancing circuit, independent means for adjusting said balancing circuit, and a current-responsive device controlling said motor and controlled by said balancing circuit.

79. The combination with a control member, of a motor operative in opposite directions for moving said control member in opposite directions, a balancing circuit, means actuated in opposite directions by said motor for adjusting said circuit, independent means for adjusting said circuit, and a current-responsive device controlled by said circuit and controlling by its movements in opposite directions operation of said motor in opposite directions.

In testimony whereof I have hereunto affixed my signature this 29 day of November, 1920.

LEO BEHR.